(12) United States Patent
Falk

(10) Patent No.: US 8,408,529 B2
(45) Date of Patent: Apr. 2, 2013

(54) CLAMP

(75) Inventors: John Falk, Simi Valley, CA (US); Mindaugas E. Gedgaudas, legal representative, Pacoima, CA (US)

(73) Assignee: Arc Machines, Inc., Pacoima, CA (US)

( * ) Notice: Subject to any disclaimer, the term of this patent is extended or adjusted under 35 U.S.C. 154(b) by 855 days.

(21) Appl. No.: 12/499,020

(22) Filed: Jul. 7, 2009

(65) Prior Publication Data

US 2010/0096793 A1 Apr. 22, 2010

Related U.S. Application Data

(63) Continuation-in-part of application No. 11/837,466, filed on Aug. 10, 2007, now abandoned.

(60) Provisional application No. 60/843,457, filed on Sep. 8, 2006.

(51) Int. Cl.
  *B23Q 3/00* (2006.01)
  *B21J 13/08* (2006.01)

(52) U.S. Cl. ........................ 269/287; 219/161

(58) Field of Classification Search .............. 269/287; 219/161
See application file for complete search history.

(56) References Cited

U.S. PATENT DOCUMENTS

| | | | | |
|---|---|---|---|---|
| 1,895,281 | A | * | 1/1933 | Currie .......................... 269/163 |
| 4,810,848 | A | * | 3/1989 | Kazlauskas ................. 219/60 A |
| 4,857,690 | A | * | 8/1989 | Kazlauskas ................. 219/60 A |
| 4,868,367 | A | * | 9/1989 | Benway et al. ................ 219/161 |
| 4,973,823 | A | * | 11/1990 | Benway et al. ................ 219/161 |
| 5,136,134 | A | * | 8/1992 | Benway et al. ............ 219/60 A |
| 5,223,686 | A | * | 6/1993 | Benway et al. ............ 219/60 A |
| 5,841,089 | A | * | 11/1998 | Martinenas ................. 219/60 A |
| 6,325,366 | B1 | * | 12/2001 | Kane et al. ..................... 269/43 |
| 6,355,899 | B1 | * | 3/2002 | Kane et al. .................. 219/60 A |
| 6,646,219 | B2 | * | 11/2003 | Kane et al. .................. 219/60 A |
| 7,414,220 | B2 | * | 8/2008 | Oyster et al. ................ 219/60 A |
| 7,661,574 | B1 | * | 2/2010 | McGushion .................. 228/49.3 |
| 2008/0061487 | A1 | * | 3/2008 | Falk ............................... 269/52 |
| 2010/0096793 | A1 | * | 4/2010 | Falk et al. ..................... 269/287 |

* cited by examiner

*Primary Examiner* — Lee D Wilson
*Assistant Examiner* — Jamal Daniel
(74) *Attorney, Agent, or Firm* — Aaron P. McGushion

(57) ABSTRACT

The problem of firmly gripping a cylindrical component over a range of permitted diameters is solved by providing a protrusion on the surface of a cantilevered seat, the seat being substantially complementarily curved to accommodate the cylindrical component. In a preferred embodiment of the present invention a clamp for holding a cylindrical component is provided comprising at least one curved seat having at least one protrusion, the curved seat being cantilevered by a first end. The protrusion is configured to contact the cylindrical component under load such that a concentrated load is exerted on the curved seat between a first end and a second end causing the curved seat to be elastically deflected.

5 Claims, 5 Drawing Sheets

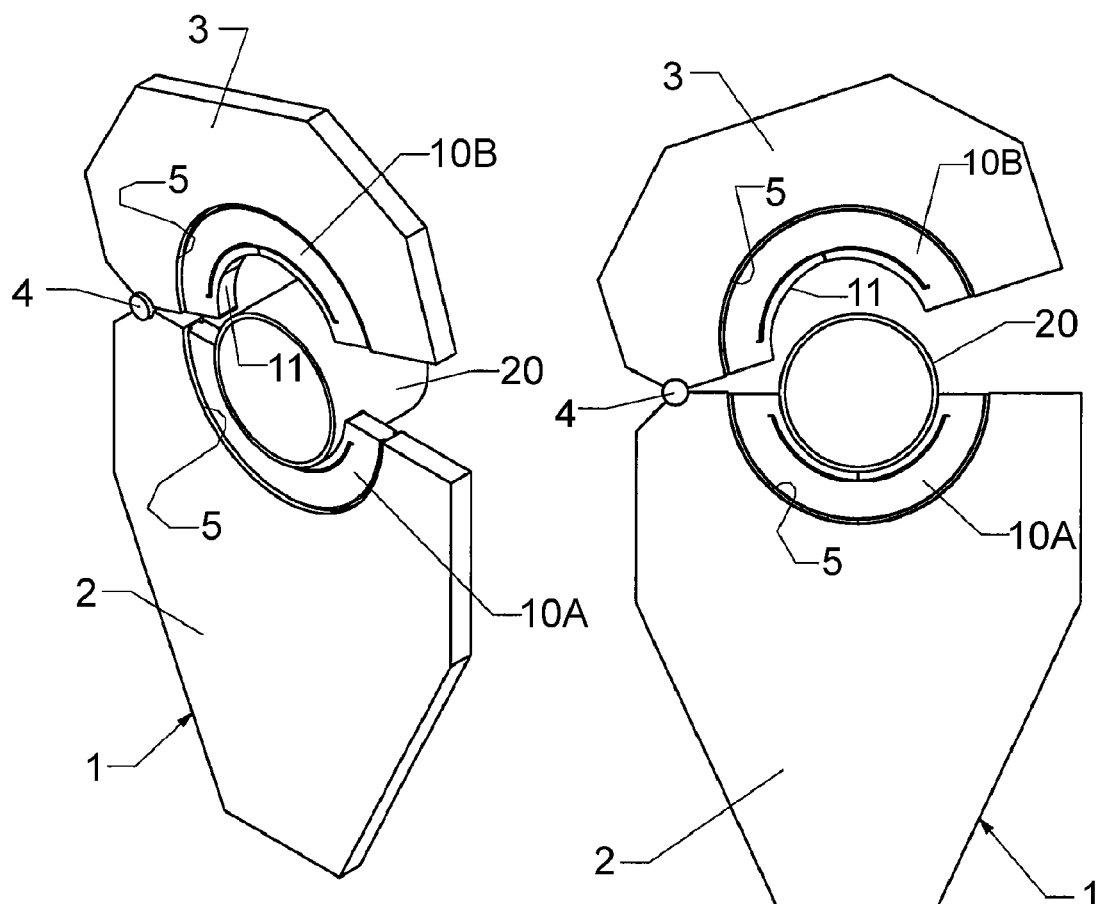

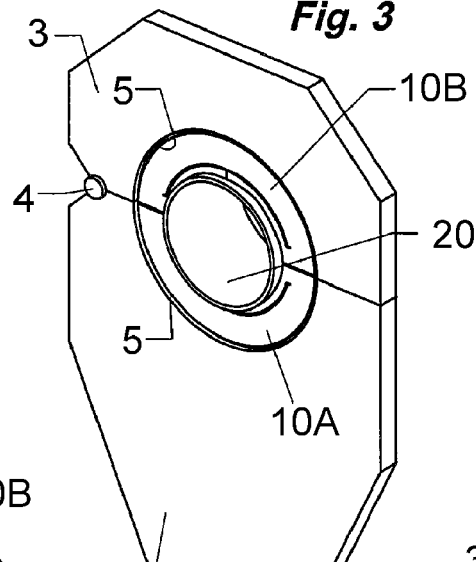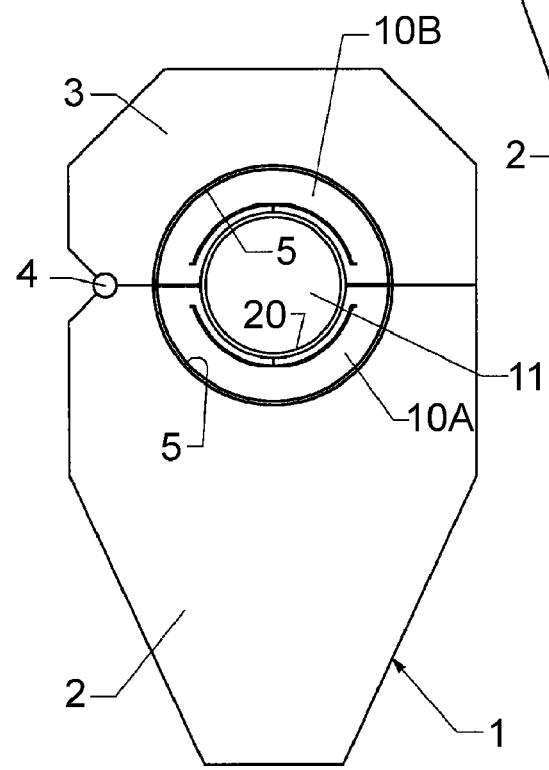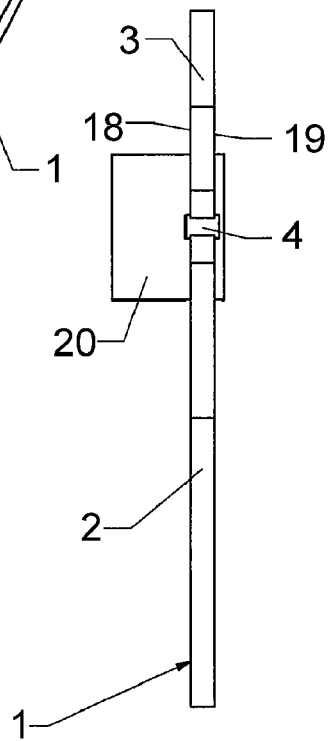

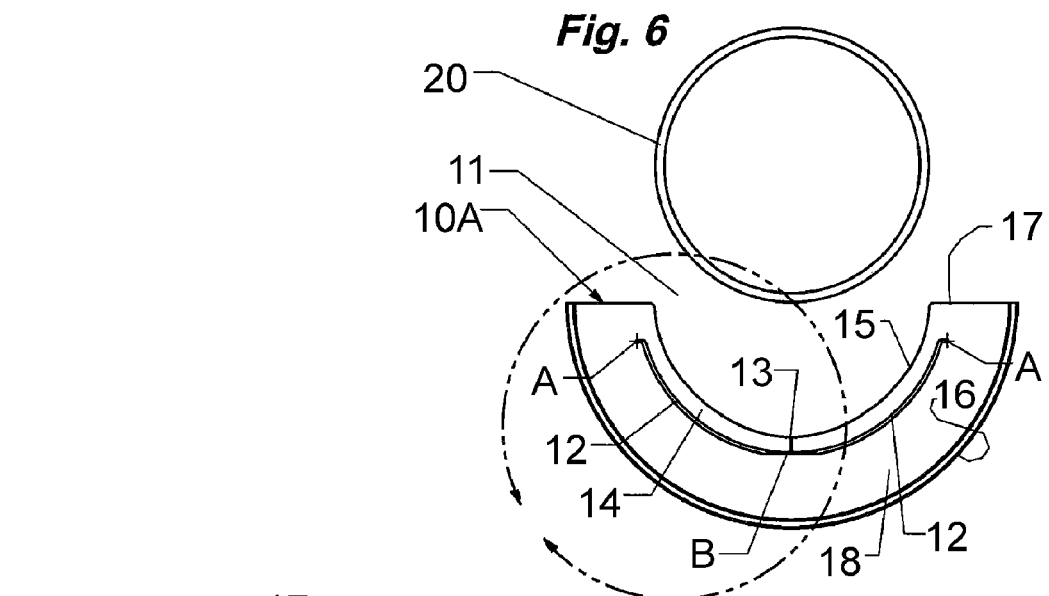
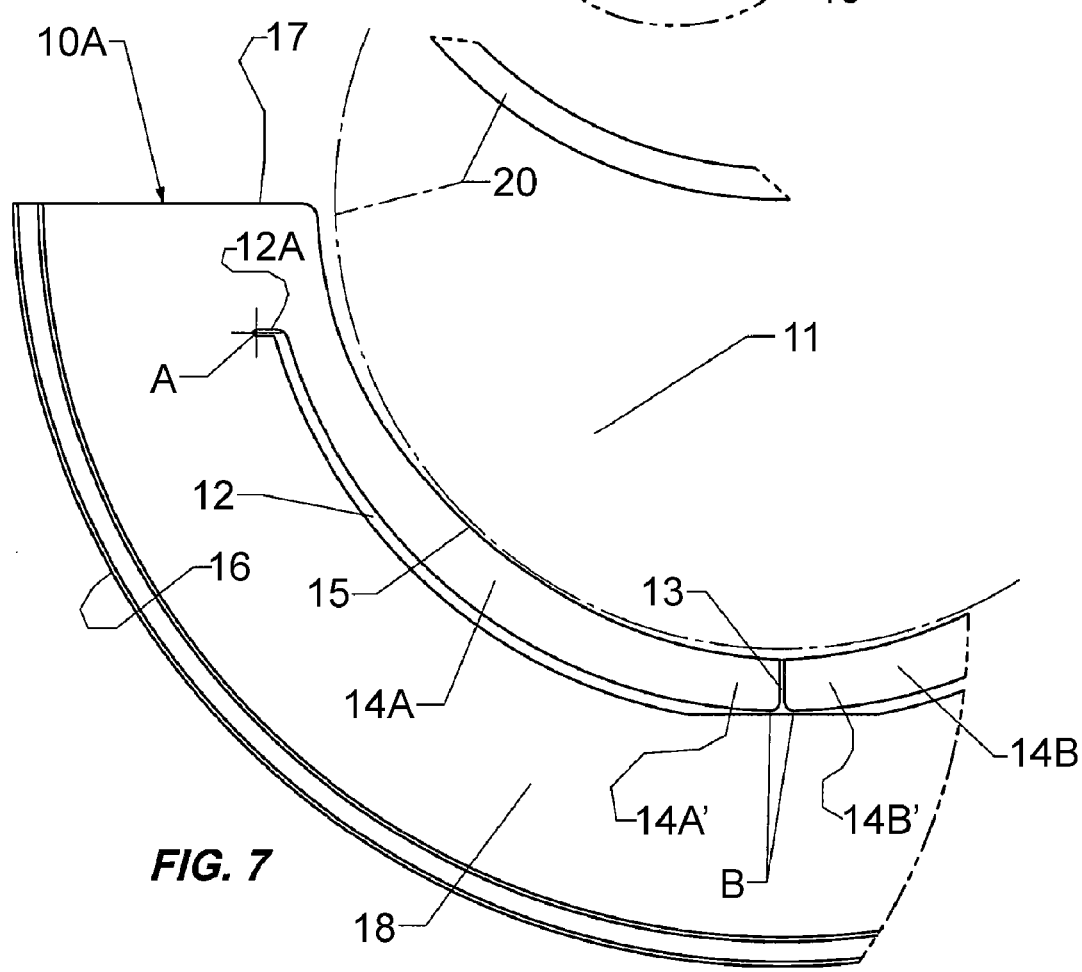

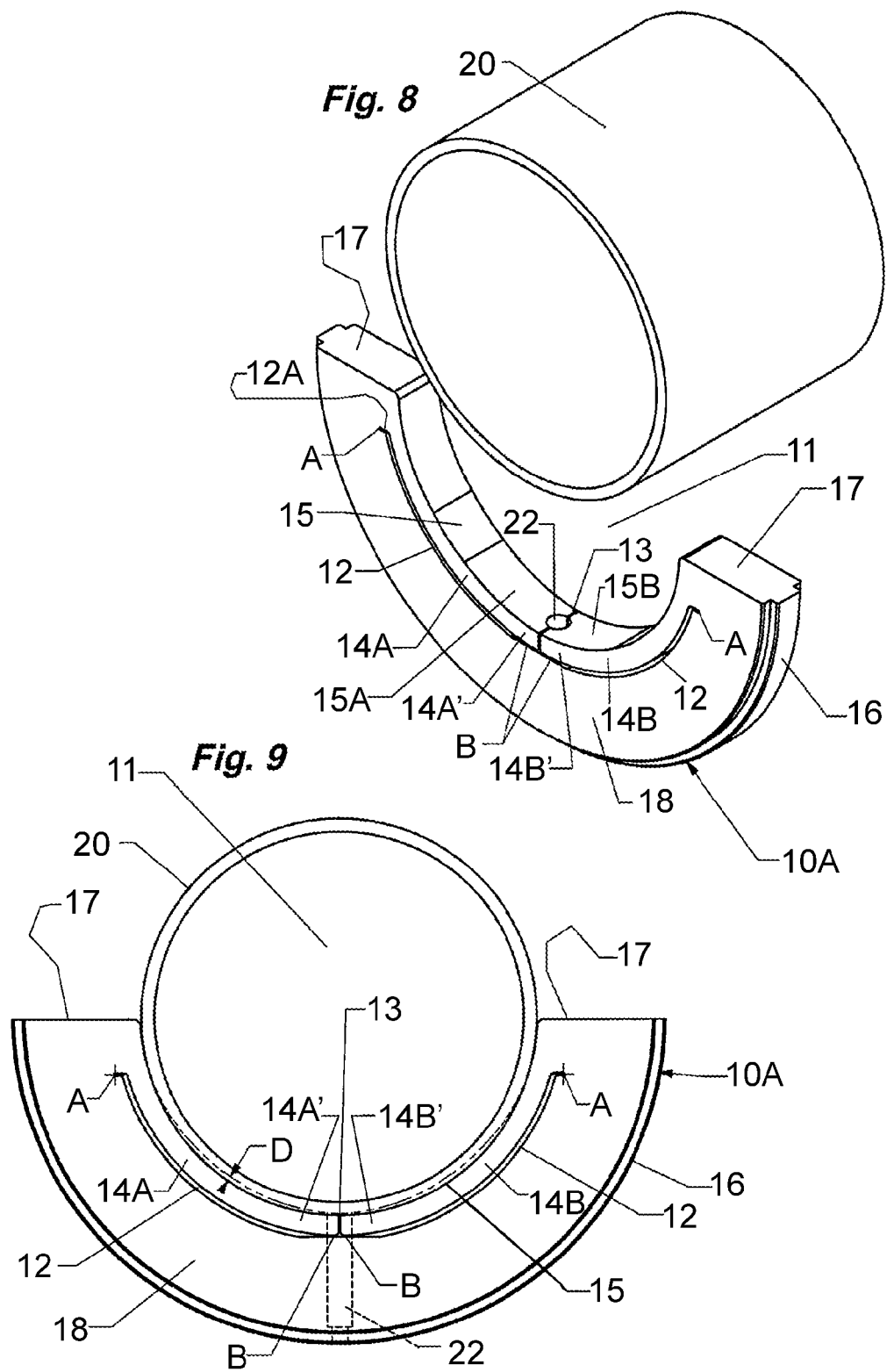

CLAMP

CROSS REFERENCE TO RELATED APPLICATION

This application is a continuation-in-part of U.S. application Ser. No. 11/837,466, filed on Aug. 10, 2007, entitled "Clamp", now abandoned, which claims the benefit of U.S. provisional patent application Ser. No. 60/843,457, filed on Sep. 8, 2006, entitled "Clamp," by John Falk, and assigned to Arc Machines, Inc., the disclosure of which is incorporated herein by reference.

BACKGROUND OF THE INVENTION

1. Field of the Invention

The present disclosure relates to the art of work holders and, more particularly, to clamps for holding objects such as cylindrical components, such as tubes.

2. Description of the Related Art

Orbital welding devices, tube welders, or weld heads are well known in industry and are used to fuse together two cylindrical or tubular components. Tube-to-tube welding or tube welding requires that two tubing sections be held so that they are in coaxial abutment during the orbiting of the weld head or its electrode about the seam of the two tubes. A tube or cylindrical component could be a bare piece of tubing or a tube that extends from a component such as a valve, mass flow controller, or the like. Tube welding devices usually require clamps for holding the pieces of tubing in position for being welded to each other. Arc Machines Inc., the assignee of this application and the invention described in the application, makes a well-known line of tube welders such as the Model 8 or 9 series. The clamp can be a separate mechanism or integrated within the structure of the welding device.

Clamps must open to receive the cylindrical component and then clamp onto the cylindrical component, firmly holding it in place relative to the weld head. However, due to the permissible variation in the outer diameter of the tubes, tightly clamping the tubes without causing undue damage to the tube can be problematic. For instance, a two inch diameter tube may have a minimum permissible diameter of 1.985 inches and a maximum permissible diameter of 2.025 inches, a range of 0.040 inches. Existing tube clamps are lacking in their ability to tightly and consistently clamp the tubing over its entire permissible range of outer diameters, without causing excessive damage to the tube, such as deforming the tube or scarring it.

U.S. Pat. No. 4,810,848 to Kazlauskas, the disclosure of which is incorporated by reference for all purposes allowed by law and regulation, discloses a tube welder having a pair of identical arc-shaped or collet shaped first clamping plates. The clamping plates each have a centrally located, half circle indentation which cooperate together to form part of a through opening. The clamping plates can fasten to the tube sections in order to hold the tube sections in coaxial abutment.

Slots forming cantilevers are cut about the half circle indentations to permit a limited amount of expansion to accommodate the standard variation of the tube outer diameters. While clamping plates with a basic cantilever design may be made to accommodate a range of variance in tube diameter, the firmness of the clamping is poor at certain diameters, such as a minimum diameter, and therefore undesirable. Additionally, after the point of maximum deformation of the cantilevers, where the slot width is generally near zero, the clamping force exerted on the tube will no longer be elastic and the possibility of damage to the tube will exist if further clamping pressure is applied.

U.S. Pat. No. 4,973,823 to Benway et al. discloses collets for clamping devices for cylindrical workpieces that have individual surface portions in the form of clamp faces formed by a concentric slot and a radial slot. These individual surface portions have the form of cantilever beams. The individual surface portions are thus mounted for independent flexing movement to accommodate workpiece tolerance variations. Again, this basic cantilever design is limited in its clamping range.

The clamping plates or collets of the references discussed above all rely only on cantilever action to provide pressure against the workpiece. Clamping plates and collets using cantilever action will have a large degree of clamping force variation even within the normal production tolerances of a given tube diameter. Additionally, once the moveable element has rotated radially a certain distance, it will contact the opposing wall of the related slot and stop providing elastic pressure to the workpiece. Simply providing a wider slot to accommodate greater displacements can either over stress the material causing strain, or will not perform well at one extreme of the tube's permissible diameter variance. The result is ineffective clamping unless greater compression is provided. Greater compression may damage either the cylindrical workpiece or the clamping plate because the compression is materially limited. Thus the range of sizes that may be accommodated while providing adequate clamping pressure is limited.

Accordingly, there has been a long-felt need in the art for a clamp that permits the firm clamping of a cylindrical component at substantially all possible deviations from the nominal value of the diameter so that rotation and/or twisting both radially or axially of the workpiece is minimized. What is also needed is a clamp that minimizes the deformation of the cylindrical component. Additionally, what is needed is a clamp with the ability to provide substantially consistent clamping force over a wide range of tube diameters.

OBJECTS OF THE INVENTION

It is an object of the present invention to provide an improved clamp for the firm clamping of a cylindrical component at substantially all possible deviations from the nominal value of the diameter so that rotation and/or twisting both radially or axially of the workpiece is minimized;

It is a further object of the present invention to provide an improved clamp that minimizes the deformation of the cylindrical component during clamping; and It is a further object of the present invention to provide an improved clamp with the ability to provide substantially consistent clamping force over a wide range of tube diameters.

These and other advantages and attainments of the present invention will become apparent to those skilled in the art upon a reading of the following detailed description when taken in conjunction with the drawings wherein there is shown and described an illustrative embodiment of the invention.

SUMMARY OF THE INVENTION

The present invention is directed to a clamp for holding a cylindrical component to permit the orbital welding of the component, or other desired process. The present invention provides a clamp that permits the firm clamping of a cylindrical component over a wide range of deviations form the nominal diameter. The present invention additionally provides a clamp that substantially prevents undue damage to the cylindrical components. Also, the present invention provides a clamp that enables a substantially consistent clamping force over a wide range of permissible diameters.

The problem of firmly gripping a cylindrical component over a range of permitted diameters is solved by providing a protrusion on the surface of a cantilevered seat, the seat being substantially complementarily curved to accommodate the cylindrical component. In a preferred embodiment of the present invention a clamp for holding a cylindrical component is provided comprising at least one curved seat having at least one protrusion, the curved seat being cantilevered by a first end. As used in this specification and the appended claims, the term "clamp" means the a tool configured to be in contact with and holding or clamping a tube or other tubular element, either configured as a insert to be attached to the clamp fixture or integrally formed or machined to the clamp fixture.

The protrusion is a portion of the curved seat which protrudes above the general curvature or profile of the curved seat, preferably serving as the initial point of contact between the cylindrical component and the curved seat and/or preferably serving as the point or region where a concentrated clamping force is imparted on the cylindrical component. A protrusion can take many forms, such as a flat portion of the curved seat, a bump, peak, or tooth on the seat's surface, or even an eccentricity or change in the curvature in the seat can provide the protrusion required.

If, as is seen in the prior art, the protrusion was not present, the inserted cylindrical components would contact the curved seat at various points, depending on the actual diameter of the tube. On the other hand, with the protrusion present, the present inventive clamp permits a predictable point of contact and force transfer between the curved seat and the cylindrical component.

In a preferred operation, the cylindrical component is placed within the curved seat of the clamp. Preferably a second opposing clamp or stop is present to provide clamping support from both sides. Additionally, it is preferred that the clamp have two curved seats with one protrusion on each seat, although other variations are contemplated and are possible within the scope of the invention. The cylindrical component contacts the protrusion of each seat and a clamping force is provided to the clamp to close the clamp about the cylindrical component, as is well known in the art of clamps and fixturing devices. The clamping force causes the cylindrical component to be pushed towards the curved seat, initially contacting the protrusion and causing the cantilevered curved seat to deflect about its connection, moving the free or second end of the curved seat from a cantilevered configuration to a simply supported configuration, where the free end is supported by the main body of the clamp.

As more clamping force is applied, the forced is primarily concentrated through the protrusion, which is between the cantilevered and simply supported ends, causing the curved seat to be elastically deflected between those ends. The simply supported ends are permitted to laterally move relative to the main body of the clamp in response to the deflection. The protrusion, in effect, provides a point of predictable deflection of the curved seat, and thus provides predictable deflection and clamping pressure on the cylindrical component.

In yet another preferred embodiment of the present invention a clamp for holding a cylindrical component is provided comprising at least one cantilevered curved seat having a protrusion; the protrusion is configured for imparting a concentrated clamping force on the cylindrical component.

A method for welding a first cylindrical component held in abutment with a second cylindrical component using a welding device is also provided, comprising the steps of providing at least one clamp comprising at least one curved seat having at least one protrusion, the clamp being cantilevered by a first end; clamping at least one of the first cylindrical component and the second cylindrical component within the clamp; and welding said first cylindrical component to said second cylindrical component with said welding device.

BRIEF DESCRIPTION OF THE SEVERAL VIEWS OF THE DRAWINGS

FIG. 1 is a perspective view from above of a preferred embodiment of the clamp, showing two clamps mounted within a clamp fixture according to the invention shown in an open position and receiving a piece of tubing or other cylindrical component.

FIG. 2 is a front side view of the clamp and the cylindrical component.

FIG. 3 is a perspective view from above of the clamp and cylindrical component in which the clamp is shown in the closed position.

FIG. 4 is a front side view of the clamp and the cylindrical component.

FIG. 5 is a right side view of the clamp and the cylindrical component.

FIG. 6 is a front side view of the clamp and the cylindrical component.

FIG. 7 is a detail view of a portion of the clamp and the cylindrical component of FIG. 6.

FIG. 8 is a perspective view of the clamp and the cylindrical component.

FIG. 9 is a front side view of the clamping plate and the cylindrical component in which the cylindrical component is in contact with the clamp.

Figure 10:
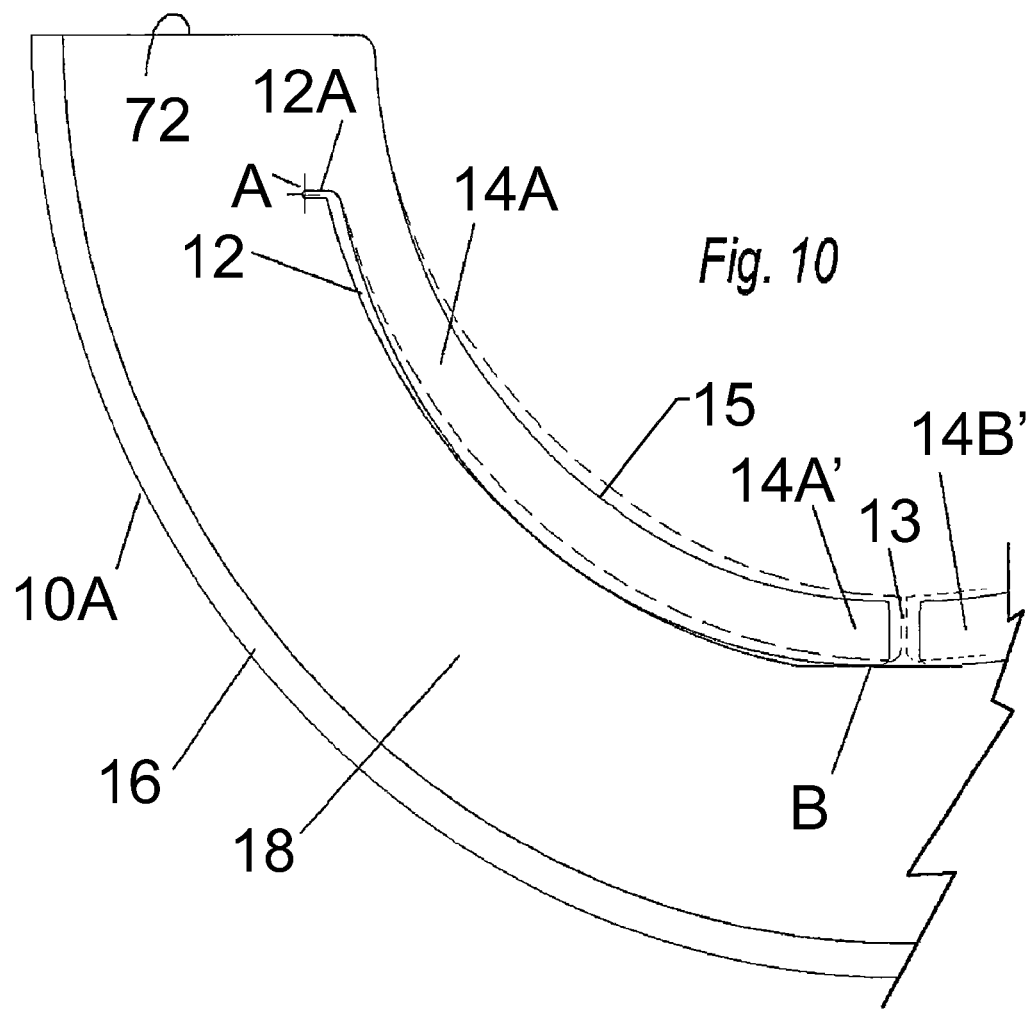
FIG. 10 is a front side view of the clamp showing and unstressed or normal curved seat position in phantom and a stressed curved seat position in a continuous line.

LISTING OF REFERENCE NUMERALS of FIRST-PREFERRED EMBODIMENT clamp assembly 1
bottom clamp fixture 2
top clamp fixture 3
pivot 4
indentation 5
clamp 10A
clamp 10B
opening 11
circumferential slot 12
sub-slot 12A
radial slot 13
curved seat 14A
free end 14A'
curved seat 14B
free end 14B'
protrusion 15
outer circumferential surface 16
radial surface 17
front side surface 18
back side surface 19
tubing 20
countersunk hole 22
pivot point A
support B
deflection D
pivot point E
support F

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

Referring to FIGS. 1-10, a preferred embodiment of a clamp 10A-B is shown. The clamp 10 is suitable for use with an orbital welding device or tube welder although, its application is to be understood to be not so limited. The clamp 10 may hold any cylindrical component or workpiece. The clamp 10 therefore may hold, for example, a tube, cylinder bar stock, or the like.

The clamp assembly 1 has a bottom clamp fixture 2 hingably connected by pivot 4 to a top clamp fixture 3. The top and bottom clamp fixtures 2 and 3 have surfaces provided with indentations 5 for holding the clamps 10A and 10B, respectively. Rotation of the top clamp fixture 3 towards the bottom clamp fixture 2 will bring the clamps 10B and 10A together to hold a cylindrical component in an opening 11. The clamps 10A and 10B of this embodiment are substantially identical to each other and thus could be interchanged. Although, an opposing clamp of a different design may be used in conjunction with the present clamp.

A cylindrical component in the form of a piece of tubing 20 is shown in FIGS. 1-9. In FIGS. 1 and 2 the top clamp fixture 3 has been rotated about the pivot 4 away from the bottom clamp fixture 2, which will permit the piece of tubing 20 to be inserted into the opening 11.

FIGS. 3-5 show the clamp 1 fully engaged to the piece of tubing 20, in a closed configuration. The top clamp fixture 3 has been rotated so that it is adjacent to the bottom clamp fixture 2. It will be understood by those of skill in the art that some level of torque will be exerted on the top clamp fixture 3 in order to press its associated clamp 10B against clamp 10A of the bottom clamp fixture 2. The clamp assembly 1 may be locked or kept in this position by a locking means, such as a cam mechanism, clip, or the like, not shown in the drawings, but well known in the art and are therefore not further discussed.

The bottom clamp fixture 2 and the top clamp fixture 3 each have a substantially semi-cylindrical indentation 5 arranged so that the indentations 5 of the clamp fixtures 2 and 3 form a substantially cylindrical opening when the clamp assembly 1 is closed, as shown in FIGS. 3-5. Each of the indentations 5 is adapted to receive an arc-shaped clamp 10A or 10B. The clamp 10A that is positioned in the indentation 5 of the bottom clamp fixture 2 and clamp 10B that is position in the indentation 5 of the top clamp fixture 3 are preferably, but not necessarily, identical. When the clamp assembly 1 is in the closed position, clamps 10A and 10B will engage the tubing 20 within the clamps 10A and 10B that define a substantially cylindrical opening 11.

It will be understood that the shapes of the clamp fixtures 2 and 3, the indentations 5, and the clamps 10A and 10B shown in the drawings are currently preferred, but also are matters of choice and may be varied. The shape of the indentations in the clamps 10A and 10B, and thus the opening 11, may not exactly cylindrical, as further described below, although they may be so shaped.

The clamps 10A and 10B may be inserted and removed from the indentations 5 as needed. Those of skill in the art will appreciate that different pairs of clamps 10A and 10B may be used to engage cylindrical components of differing diameters as the situation requires. Thus, instead of changing the clamp assembly 1, one need only change the clamps 10A and 10B in order to accommodate cylindrical components of a different diameter, the clamps corresponding to the diameter.

FIGS. 6-10 each depict the clamp 10A shown in FIGS. 1-5 as part of the clamp assembly 1. It will be understood that, in this embodiment, clamp 10B may be identical to clamp 10A and the discussion of clamp 10A can also apply to clamp 10B. FIG. 6 shows the clamp 10A about to receive the piece of tubing 20. The clamp 10A has a front side surface 18 as shown in FIG. 6 and a back side surface 19 as indicated in FIG. 5, an outer circumferential surface 16 that engages the bottom or top clamp fixture 2 or 3 within the indentation 5. The clamping plate 10 also has two radial surfaces 17, which are substantially parallel to each other. The clamp 10A is preferably fabricated from common alloys such as aluminum, titanium, or steel alloys. FIGS. 8 and 9 show a countersunk hole 22 formed within the clamp 10A, which receives a screw in order to secure the clamp 10A to the bottom clamp fixture 2.

The clamping plate 10A has cut or milled into it a circumferential slot 12 that communicates between the front side surface 18 and the back side surface 19, with a radial slot 13 cut there through, to form two curved seats 14A and 14B. On the inner diameter curved surface (15A or 15B) and protruding from the surface (15A or 15B) of the curved seat, opposite the circumferential slot 12, is a protrusion 15 between the cantilevered and simply supported ends. Looking at FIG. 7, it can be seen that the protrusion 15 need not be large. In this case, the protrusion 15 is a slight eccentricity or flattening of the curved seat 14A when compared to the tube 20 shown in phantom. In this way, the tube 20, upon insertion into the clamp 10A, will contact the protrusion 15, which protrudes into the opening 11. Other protrusion sizes and configurations may also be compatible with the present invention.

A support B may be provided to radially support the curved seats 14A and 14B to limit their elastic travel and provide a simple support for the free ends 14A' and 14B'. The radial slot permits the curved seats 14A and 14B to move away from one another upon deflection.

The circumferential slots 12 in the vicinity of pivot point A preferably turn radially outward to form sub-slots 12A to act as stress relievers and substantially prevent unacceptable stress risers. These sub-slots 12A help the curved seats 14A and 14B to flex radially outward between the pivot points A and the free ends 14A' and 14B'. Clamps 10A and 10B that have openings 11 of small diameter in order to accommodate cylindrical components of small diameter, such as small diameter tubing 20, preferably will have sub-slots 12A that are proportionally longer than a larger diameter clamp. This is because common machining or fabricating processes result in a finite width of the slots 12 in the region of the supports B when creating the free ends 14A' and 14B' of the supported beam. As a result, the curved seats 14A and 14B which are designed to accommodate smaller diameter tubing must be capable of flexing relatively more than curved seats 14A and 14B that are designed to accommodate larger diameter tubing. Thus, a relatively longer sub-slot 12A preferably should be provided for the clamps 10A and 10B designed to accommodate smaller diameter tubing.

FIG. 9 shows the tubing 20 engaged within the clamp 10A as when the top clamp fixture 3 is compressed against the bottom clamp fixture 2. The dashed curve shows the position of the protrusion 15 and surrounding curved seat 14A or 14B before the clamp 10A is transitioned to the closed configuration. When the clamps 10A and 10B are forced together against the tubing 20 by torquing the clamps fixtures 2 and 3, as shown in FIGS. 3-5, the curved seats 14A and 14B are forced radially outward and hinge about their pivots at points A. Accordingly, the free ends 14' and 14B' are driven against the supports B, the curved seats 14A and 14B are now supported beams, in that they are supported by the support B at one end and at its other end by the clamp 10A at point A. Once they are supported beams, the curved seats 14A and 14B will further deform elastically and radially outward and away from the piece of tubing 20, bending substantially at due to the pressure exerted between the tube 20 and the protrusion 15. The point of greatest deflection D is generally in the central region of the curved seats 14A and 14B. The free ends 14A' and 14B' of the curved seats 14A and 14B will accordingly diverge from each other in a concentric direction above the support B. The radial slot 13 will thus widen.

FIG. 10 shows, with continuous lines, a quadrant of the clamp 10A in the configuration it has when engaging a workpiece that is larger than the nominal specification. The curved seats 14A and 14B are deflected further to accommodate the larger tube, causing the free end 14A' of the curved seat 14A to slide circumferentially with respect to the support B as the curved seat 14A is more greatly deflected, and the same is true of curved seat 14B. FIG. 10 also shows, with phantom lines, a quadrant of the clamp 10A in the configuration it has when engaging a cylindrical component that is smaller than the nominal specification, with the deflection being smaller that the previous case.

It has been determined by three dimensional solid modeling and Finite Elemental Analysis that a satisfactory range of accommodation can be provided for different sizes of cylindrical components or tube sections while providing a very secure and tight clamping action on the workpiece that does not permit twisting or axial translation of the workpiece. For example, for tubing having a nominal two inch diameter, clamps 10A and 10B can accommodate tubing having a minimum diameter of 1.985 inches and a maximum diameter of 2.025 inches, a range of 0.040 inches, with satisfactory clamping action. A range of +/−0.010 inches will suffice to accommodate nearly all tubing. For a nominal diameter of two inches the common minimum diameter is 1.99 inches and 2.023 inches, a range of 0.033 inches. Thus, a wide range of diameters, greater than the range of many tolerances, can be accommodated, reducing the need for expensive, highly accurate tubing or other cylindrical components.

Clamping devices made according to the invention have been found to exhibit a range of clamping force across their ranges of accommodation that is smaller and thus superior to known clamps. At small diameters the ratio of maximum clamp force to minimum clamp force may be as low as 3.5 to 1 when measured across the range of accommodation whereas the ratio may be as low as 2.6 to 1 for larger diameter. The comparable ratios for known clamps are much higher. For a clamp built according to the dual cantilever design shown in U.S. Pat. No. 4,810,848, the ratios will be 18 to 1 for smaller diameter tubes and 10 to 1 for larger diameter tubes.

While particular forms of the invention have been illustrated and described, it will also be apparent to those skilled in the art that various modifications can be made without departing from the spirit and scope of the invention. Accordingly, it is not intended that the invention be limited except by the claims.

What is claimed is:

1. A clamp for holding a cylindrical component, said clamp comprising:
    a curved seat having an inner diameter curved surface, said inner diameter curved surface complementarily curved for receiving said cylindrical component, said curved seat being cantilevered by a first end and having a free end distally located from said first end;
    a protrusion is formed on said inner diameter curved surface of said curved seat, said protrusion extending from said inner diameter curved surface between said first end and said free end;
    wherein when said cylindrical component is placed within said clamp, said cylindrical component initially contacts said protrusion;
    and wherein as clamping force is applied to said cylindrical component through said clamp, said cylindrical component applies concentrated force on said curved seat solely through said protrusion.

2. The clamp of claim 1 further comprising a second curved seat substantially similar to said curved seat.

3. The clamp of claim 1 wherein said clamp is configured for mounting within a clamping device; a first clamp and a second clamp arranged to circumferentially grip said cylindrical component within said clamping device.

4. The clamp of claim 1 wherein said free end of said curved seat is configured to contact a support beneath said free end while under load; whereby said protrusion is configured to contact said cylindrical component under load such that a concentrated load is exerted on said curved seat between said first end and said free end causing said curved seat to be elastically deflected.

5. A clamp for holding a cylindrical component, said clamp comprising:
    at least one cantilevered curved seat having a protrusion formed on an inner diameter curved surface of said curved seat, said protrusion extending from said inner diameter curved surface between a cantilevered end and a free end;
    said protrusion configured for imparting a concentrated clamping force on said cylindrical component.

* * * * *